US012492751B2

United States Patent
Lee (10) Patent No.: US 12,492,751 B2
(45) Date of Patent: Dec. 9, 2025

(54) DRUM SEALING GASKET FOR WASHING AND DRYING MACHINE

(71) Applicant: HEAD LINE CO., LTD., Gwangju (KR)

(72) Inventor: Ho-Jun Lee, Gwangju (KR)

(73) Assignee: HEAD LINE CO., LTD., Gwangju (KR)

( * ) Notice: Subject to any disclaimer, the term of this patent is extended or adjusted under 35 U.S.C. 154(b) by 132 days.

(21) Appl. No.: 18/467,902

(22) Filed: Sep. 15, 2023

(65) Prior Publication Data

US 2024/0218932 A1    Jul. 4, 2024

(30) Foreign Application Priority Data

Jan. 4, 2023  (KR) ......................... 10-2023-0001349

(51) Int. Cl.
*F16J 15/3284*    (2016.01)
*D04H 1/4266*    (2012.01)
(Continued)

(52) U.S. Cl.
CPC ........ *F16J 15/3284* (2013.01); *D04H 1/4266* (2013.01); *D04H 1/4291* (2013.01);
(Continued)

(58) Field of Classification Search
CPC ..... D10B 2505/06; D06F 37/20; D06F 37/02; D06F 25/00; D04H 1/488; D04H 1/4291;
(Continued)

(56) References Cited

U.S. PATENT DOCUMENTS 3,875,686 A  *  4/1975  Smoot ................... F16J 15/3284
                                                     34/601
4,007,546 A  *  2/1977  Sauer ....................... D06F 58/04
                                                     34/602
(Continued)

FOREIGN PATENT DOCUMENTS

CN       102797850 A  *  11/2012  ............. D06F 37/04
KR       101073031 B1     10/2011
(Continued)

OTHER PUBLICATIONS

Notice of Allowance issued in corresponding KR Application No. 10-2023-0001349, issued May 12, 2023, and an English Translation, 6 pages.
(Continued)

*Primary Examiner* — Eugene G Byrd
(74) *Attorney, Agent, or Firm* — Burris Law, PLLC (57) ABSTRACT

A drum sealing gasket of a washing and drying machine is disposed on an end of a drum. The drum sealing gasket includes a band-shaped belt manufactured by cutting a felt in which natural fiber and synthetic fiber are mixed. A finishing space is formed by folding both peripheral portions of the belt and sewing the peripheral portions to the body of the belt with an adhesive-coated sewing thread. An extension is formed on one of the folded peripheral portions to cover a portion of the other of the folded peripheral portions. A flexible band is added and sewn to the surface of the extension with an adhesive-coated thread. Both ends of the belt are bound without a height difference.

8 Claims, 4 Drawing Sheets

(51) Int. Cl.
    *D04H 1/4291*     (2012.01)
    *D04H 1/4382*     (2012.01)
    *D04H 1/488*     (2012.01)
    *D06F 25/00*     (2006.01)
    *D06F 37/02*     (2006.01)
    *D06F 37/20*     (2006.01)

(52) U.S. Cl.
    CPC ......... *D04H 1/43835* (2020.05); *D04H 1/488* (2013.01); *D06F 25/00* (2013.01); *D06F 37/02* (2013.01); *D06F 37/20* (2013.01); *D10B 2505/06* (2013.01)

(58) Field of Classification Search
    CPC . D04H 1/4266; D04H 1/43835; F16J 15/3284
    See application file for complete search history.

(56) References Cited

U.S. PATENT DOCUMENTS

2013/0048219 A1     2/2013   Ferreiro
2018/0274160 A1*   9/2018   Lowe ................... D06F 37/263

FOREIGN PATENT DOCUMENTS

| KR | 101260923 B1 | 5/2013 |
| KR | 101466045 B1 | 11/2014 |
| KR | 101953334 B1 | 5/2019 |

OTHER PUBLICATIONS

Office Action issued in corresponding KR Application No. 10-2023-0001349, issued Mar. 17, 2023, and an English Translation, 13 pages.

* cited by examiner

DRUM SEALING GASKET FOR WASHING AND DRYING MACHINE

CROSS REFERENCE TO RELATED APPLICATION

The present application claims priority to Korean Patent Application No. 10-2023-0001349, filed Jan. 4, 2023, the entire contents of which are incorporated herein for all purposes by this reference.

FIELD

The present disclosure relates to a drum sealing gasket for a washing and drying machine, the gasket being disposed on an end of a drum of a washing and drying machine that washes and dries laundry in order to protect the end of the drum, ensure fluid tightness, minimize noise, and increase heat resistance, wear resistance, and binding force.

BACKGROUND

Generally, a washing and drying machine that washes and dries laundry has a drum disposed therein in order to wash and dry the laundry. Hot air is supplied into the drum to dry the washed laundry. In order to prevent the hot air supplied into the drum from leaking, a sealing gasket is disposed on each end of the drum.

The washing and drying machine is an apparatus configured to automatically dry washed wet laundry. The washing and drying machine includes a rotating drum disposed within a body cabinet, a drive unit configured to rotate the drum, a front support and a rear support closing the front and rear portions of the drum to define a drying space and supporting the front end and the rear end, and a heater generating hot and dry air in order to automatically dry washed wet laundry.

A gasket made of a felt is disposed between the front support and the drum or the rear support and the drum of the above-described washing and drying machine in order to prevent hot air from leaking.

The gasket is bonded to one end of a drum by means of an adhesive while surrounding the outer circumferential portion of the end of the drum. When the gasket is exposed to hot air for a long time, the gasket may be separated from the drum or the felt may be stretched, thereby decreasing the sealing property.

In addition, since both ends of the felt are overlapped and sewn, a stepped portion is formed on the sewn portion. Due to the stepped portion, the sealing property may also be decreased.

Figure 1:
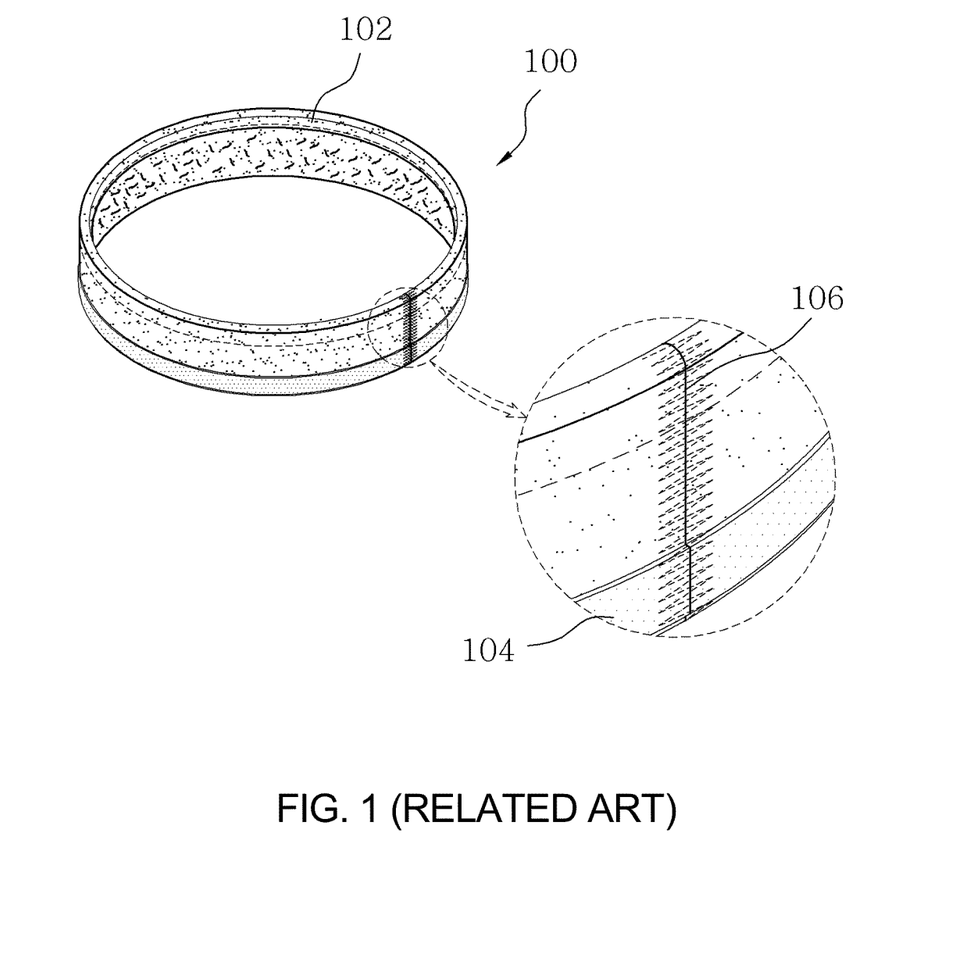
FIG. 1 is a perspective view illustrating a related-art drum sealing gasket for a laundry driver.
Figure 2:
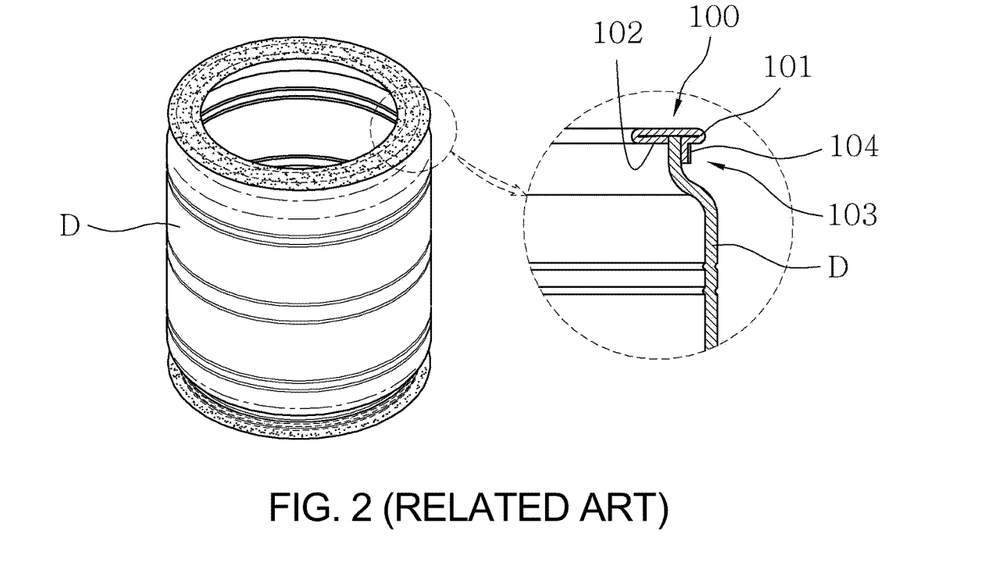
FIG. 2 is an enlarged perspective view illustrating main parts in a position in which the related-art drum sealing gasket for a laundry driver is disposed in a drum.

As a method for overcoming the above-described problems, a gasket pad for sealing a drum is disclosed in Korean Patent No. 10-1073031, and a configuration thereof will be described below with reference to FIGS. 1 and 2.

In a felt fabric 100 cut in an intended length and width, a pair of peripheral portions 101 and 102 of the felt fabric 100 are folded in the width direction of the felt fabric 100 and then sewn to the body of the felt fabric 100 so as to be double-layered. Here, a portion of one of the folded peripheral portions is formed as an extension 103 covering a portion of the other of the folded peripheral portions. A flexible band 104 is placed on and sewn to the surface of the extension 103 in the longitudinal direction. Then, both end portions of the felt fabric 100 having the double-layered peripheral portions are brought into surface contact in the form of a butt contact 106 and sewn together so as to have no height difference therebetween.

A drum sealing gasket pad P having the above-described configuration according to Korean Patent No. 10-1073031 is disposed on a drum. During use, a sewing thread sewn to the felt fabric 100 in the longitudinal direction may be torn by friction or heat. Then, the binding force of the components of the drum sealing gasket pad P may be broken, thereby decreasing the sealing force.

The foregoing is intended merely to aid in the understanding of the background of the present disclosure, and is not intended to mean that the present disclosure falls within the purview of the related art that is already known to those skilled in the art.

Documents of Related Art (Patent Document 1) Korean Patent No. 10-1073031 (published on Oct. 13, 2011)
(Patent Document 2) Korean Patent No. 10-1260923 (published on May 6, 2013)
(Patent Document 3) Korean Patent No. 10-1953334 (published on May 23, 2019)

SUMMARY

Accordingly, the present disclosure has been made keeping in mind the above problems occurring in the related art, and objectives of the present disclosure are as follows.

First, the present disclosure is intended to provide a drum sealing gasket of a washing and drying machine able to protect an end of a drum of a washing and drying machine and have increased sealing force.

In addition, even in the case in which a sewn line of the gasket is torn during use, the binding force of the components of the gasket may be firmly maintained instead of being broken, thereby increasing the longevity of the gasket.

In order to achieve at least one of the above objectives, according to one aspect of the present disclosure, there is provided a drum sealing gasket of a washing and drying machine, the drum sealing gasket including: a band-shaped belt of a cut felt manufactured by mixing natural fiber that is a mixture of one or more among wool fiber, cotton fiber, hemp fiber, and silk fiber and synthetic fiber that is a mixture of one or more among polyolefin, polyester, polyamide, polyacrylic, rayon, and nylon; both transverse-direction peripheral portions of the belt folded over the length of the belt, wherein one of the peripheral portions is folded such that the edge thereof does not reach the longitudinal centerline of the belt, the other of the peripheral portions is folded such that the edge thereof extends beyond the longitudinal centerline of the cut belt, and both the peripheral portions are integrally sewn with a body of the belt with a sewing thread coated with a polydimethylsiloxane adhesive; wherein a finishing space is provided in a transverse-direction central portion of the belt to extend in a longitudinal direction with a width of 2 mm to 15 mm such that a finishing portion provided on an end of a drum is tightly received therein; wherein the other of the peripheral portions folded such that the edge thereof extends beyond the longitudinal centerline of the cut belt has an extension extending to cover a portion of the one of the peripheral portions folded such that the edge thereof does not reach the longitudinal centerline of the belt; and a flexible band added to a surface of the extension and sewn with the sewing thread coated with a polydimethylsiloxane adhesive so as to be integrated with the extension, wherein both ends of the belt to which the flexible band is sewn are brought into butt contact with each other without a height difference, and contact portions are sewn with the sewing thread coated with a polydimethylsiloxane adhesive to form a binding portion.

The drum sealing gasket of a washing and drying machine having the above-described configuration according to the present disclosure may have improved sealing force and protect the end of the drum of a washing and drying machine, as described above with respect to the objectives. Even in the case in which a sewn line of the gasket is torn during use, the binding force of the components of the gasket may be firmly maintained instead of being broken, thereby increasing the longevity of the gasket.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

The present disclosure relates to a drum sealing gasket for a washing and drying machine, the gasket being disposed on an end of a drum of a washing and drying machine that washes and dries laundry in order to protect the end of the drum, ensure fluid tightness, minimize noise, and increase heat resistance, wear resistance, and binding force. Embodiments of the present disclosure will be described below with reference to the accompanying drawings.

In a drum sealing gasket for a washing and drying machine according to the present disclosure, natural fiber is a mixture of one or more among wool fiber, cotton fiber, hemp fiber, and silk fiber. The natural fiber is used as described above because natural fiber has excellent air permeability and absorbency and can reduce the generation of static electricity due to friction.

The natural fiber that can reduce the generation of static electricity due to friction may be a mixture of one or more among wool fiber, cotton fiber, hemp fiber, and silk fiber. Here, wool fiber may be most preferable as natural fiber.

The wool fiber is most preferable to use because the wool fiber is hydrophilic fiber and has a large amount of amorphous portions. Thus, the wool fiber has the highest moisture absorption (e.g., 14% to 16%)) among the above-stated examples of the natural fiber and can absorb moisture up to 30% of the weight thereof.

Even though the wool fiber absorbs a large amount of moisture, a user may not feel wet or feel relatively less wet and thus feel pleasant. In addition, fabric fiber has breathability, flexibility, vibration resistance, and the like due to waved natural crimp (i.e., waved or granular curls appearing on the texture surface due to twisting of threads of texture) of the wool fiber.

The wool fiber may be implemented as rough clothing wool fiber that has been spun or may be implemented as waste wool fiber produced from the spinning process in order to reduce manufacturing costs.

In the present disclosure, synthetic fiber is added in order to compensate for drawbacks of the wool fiber such as low durability and mechanical properties. The synthetic fiber may be one or a mixture of at least two selected from polyolefin (e.g., polyethylene, polypropylene, and polybutylene), polyester, polyamide, polyacrylic, rayon, and nylon, but is not limited thereto.

Mixing the synthetic fiber with the natural fiber acts to further enhance an effect of absorbing vibration occurring during rotation of the drum and wear resistance. The synthetic fiber used to obtain such effects may be surface-treated with spinning oil.

Spinning oil serves to improve high-temperature stability and increase coherence, smoothness, and stability over time.

An example of the synthetic fiber may be made of polyethylene because polyethylene fiber may be easily fabricated and intended mechanical properties thereof may be obtained by adjusting the density or the like.

For example, the polyethylene fiber may obtain high-strength and low-shrinkage properties. Heat resistance may be adjusted by adjusting the distribution of molecular weight.

In addition, in the synthetic fiber according to the present disclosure, a portion of the polyethylene fiber may be substituted with flexible fiber in order to further increase wear resistance and vibration suppression effects.

The flexible fiber may obtain the effect of enhancing mechanical properties. In particular, the flexible fiber may significantly improve wear resistance and wear reduction effect due to the increased elongation rate.

The mixing ratios of the natural fiber and the synthetic fiber may be determined such that the mixing ratio of the natural fiber is 30% to 70% by weight and the mixing ratio of the synthetic fiber is 30% to 70% by weight.

When the natural fiber is used at a ratio less than 70% by weight and the synthetic fiber is used at a ratio greater than 30% by weight, the ability of the drum sealing gasket according to the present disclosure to increase the wear resistance and vibration suppression effects may be improved but the breathability and antistatic effect of the natural fiber may be reduced. In contrast, when the natural fiber is used at a ratio greater than 70% by weight and the synthetic fiber is used at a ratio less than 30% by weight, the breathability and antistatic effect of the drum sealing gasket according to the present disclosure may be improved but the ability of the drum sealing gasket to increase the wear resistance and vibration suppression effects may be reduced.

In addition, according to the present disclosure, the mixture of the natural fiber and the synthetic fiber may be further mixed with threads of natural or synthetic fiber. The mixing ratio of the natural fiber, the synthetic fiber, and the threads may be determined such that the mixing ratio of the natural fiber is 35% to 60% by weight, the mixing ratio of the synthetic fiber is 39% to 45% by weight, and the mixing ratio of the threads is 1% to 20% by weight.

The threads of natural or synthetic fiber are added to the mixture of the natural fiber and the synthetic fiber in order to increase entanglement between the natural fiber and the synthetic fiber when the natural fiber and the synthetic fiber are mixed so as to be entangled using a needle punch, thereby imparting firmness to the drum sealing gasket according to the present disclosure.

The lengths of the threads of natural or synthetic fiber may be determined to be equivalent to the length of natural or synthetic fiber to be described below. The threads of natural or synthetic fiber to be used may be coated with an adhesive (made of polydimethylsiloxane).

The threads of natural or synthetic fiber coated with an adhesive are used in order to ensure the binding force of the natural fiber, the synthetic fiber, and the threads of natural or synthetic fiber supposed to form a belt is stably maintained instead of being broken after the natural fiber, the synthetic fiber, threads of natural or synthetic fiber are entangled with and bound to each other.

When the threads of natural or synthetic fiber are used at a ratio less than 1% by weight, the number of punching operations using the needle punch is required to be increased. In contrast, when the threads of natural or synthetic fiber are used at a ratio greater than 20% by weight, the number of punching operations using the needle punch may advantageously be reduced but it may be difficult to manufacture a felt from which the drum sealing gasket according to the present disclosure is to be manufactured. Accordingly, preferably, the mixing ratio of the threads of natural or synthetic fiber may be in the range of 1% to 20% by weight.

The fineness (i.e., the thickness of threads) of the natural fiber and the synthetic fiber may be in the range of 1 to 100 deniers and, more particularly, 10 to 50 deniers. In this range of fineness, the fibers may be easily transported while maintaining binding force. The length of the natural fiber and the synthetic fiber may be in the range of 10 mm to 100 mm.

Figure 3:
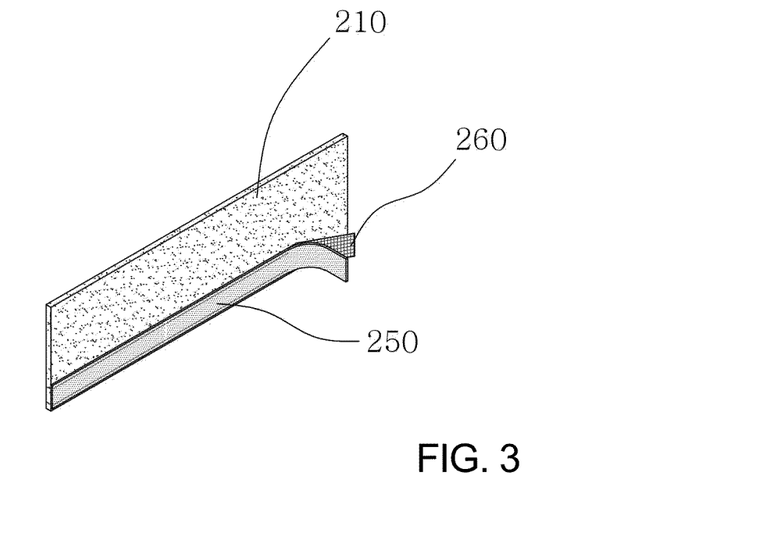
FIG. 3 is a perspective view illustrating a position in which a flexible band is disposed on a band-shaped belt from which a drum sealing gasket of a washing and drying machine according to the present disclosure is manufactured.

The felt manufactured by the above-described method is cut into a predetermined width and length to form a belt 210 in the shape of a bent as illustrated in FIG. 3. The band-shaped belt 210 is cut into the width and length by which the belt 210 may surround and protect one end of a drum 300.

Figure 4:
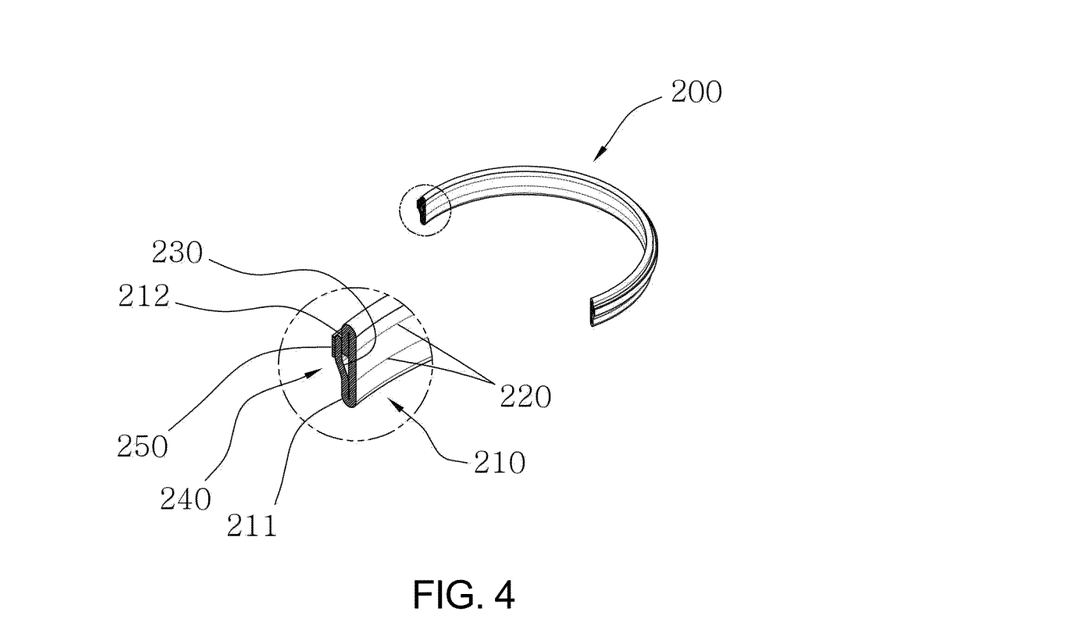
FIG. 4 is an enlarged perspective view illustrating one end surface of the manufactured drum sealing gasket of a washing and drying machine according to the present disclosure.

In the belt 210 cut as described above, both transverse-direction peripheral portions 211 and 212 extending over the length of the belt 210 are folded in the width direction to be double-layered (i.e., to overlap each other) as illustrated in FIG. 4. The overlapped portions are sewn with a sewing thread 220 coated with an adhesive, and a finishing space 230 receiving a finishing portion 310 provided on an end of the drum 300 is formed in the transverse-direction central portion of the belt 210 to extend in the longitudinal direction.

Figure 6:
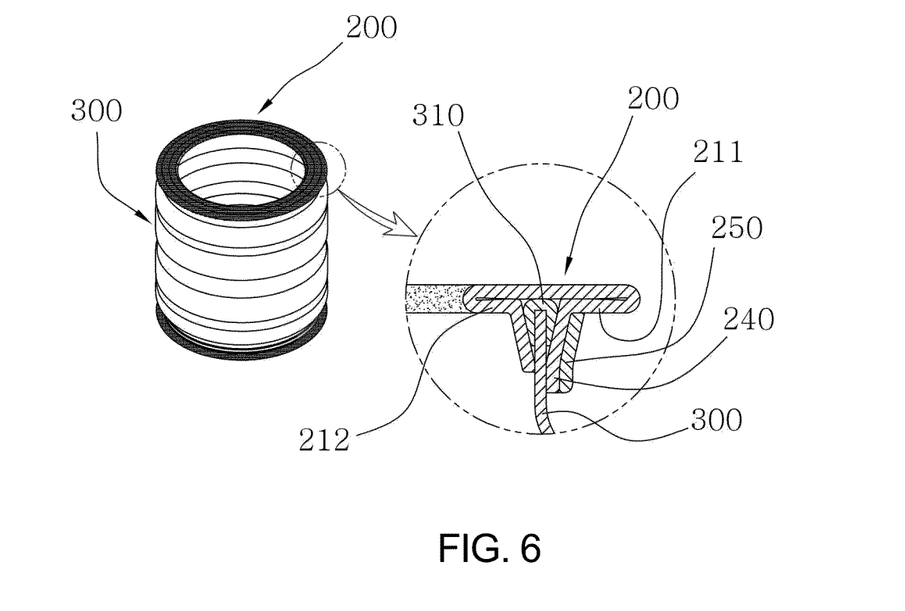
FIG. 6 is a perspective view illustrating the drum sealing gasket of a washing and drying machine according to the present disclosure disposed on a drum of a washing and drying machine and an enlarged view illustrating main parts of the drum sealing gasket.

Both the peripheral portions 211 and 212 of the belt 210 are folded to overlap each other in order to provide durability to both the peripheral portions 211 and 212 of the belt 210 and fluid tightness to the end of the drum 300 as illustrated in FIG. 6.

The transverse-direction peripheral portion 212 of the belt 210 folded in the width direction is folded to a width by which the edge of the peripheral portion 212 does not reach the longitudinal centerline of the cut belt 210, while the transverse-direction peripheral portion 211 of the belt 210 having a side extension 240 is folded to a width by which the edge of the peripheral portion 211 extends beyond the longitudinal centerline of the cut belt 210. The folded peripheral portions 211 and 212 of the belt 210 are integrally sewn to the body of the belt 210 with the sewing thread 220.

In addition, the width of the finishing space 230 formed in the transverse-direction central portion of the belt 210 to extend in the longitudinal direction is determined such that the finishing portion 310 provided on the end of the drum 300 is tightly received in the finishing space 230. The width of the finishing space 230 is set to maintain the width by which the finishing portion 310 provided on the end of the drum 300 is tightly received in the finishing space 230.

The width of the finishing space 230 by which the finishing portion 310 provided on the end of the drum 300 is tightly received in the finishing space 230 may be determined depending on the size of the finishing portion 310 provided on the end of the drum 300 varying depending on the model and size of the drum. Preferably, the width of the finishing space 230 may be maintained in the range of 2 mm to 15 mm.

In addition, both the transverse-direction peripheral portions 211 and 212 of the belt 210 are folded to be double-layered and then the folded portions are sewn with the sewing thread 220 because, when the adhesive-coated sewing thread 220 is torn due to friction and heat caused by the rotation of the drum while the drum sealing gasket 200 according to the present disclosure disposed on the end of the drum 300 is being used, the adhesive of the sewing thread 220 may be molten by the heat so as to be sticky so that the binding force may be continuously maintained instead of being broken.

The sewing thread 220 coated with the adhesive for continuously maintaining the binding force is manufactured by impregnating a fiber thread with liquid polydimethylsiloxane, drawing the fiber thread from the liquid polydimethylsiloxane, and then drying the polydimethylsiloxane-impregnated fiber thread. Since polydimethylsiloxane has sufficiently infiltrated into the fiber thread, the adhesive has advantages of increasing the durability of the sewing thread. Even when the sewn thread is torn, the adhesive may allow the sewn portion to continuously and stably maintain the binding force instead of losing the binding force.

The adhesive of polydimethylsiloxane is a type of silicone oil (polymerized siloxane) and is generally referred to as silicone. Polydimethylsiloxane belongs to polymeric organosilicon compounds, and has melting and flowing properties, i.e., fluidity.

Polydimethylsiloxane has a variety of useful properties. As advantages, polydimethylsiloxane is optically transparent in color, and has a significantly stable chemical status as an inert material. Thus, when polydimethylsiloxane is in contact with other materials, polydimethylsiloxane may maintain its state without any reaction or change. In addition, polydimethylsiloxane is fire resistant and thus has no risk of fire, and is harmless to the human body.

Polydimethylsiloxane as described above has the following chemical formula:

$$CH_3[Si(CH_3)_2O]nSi(CH_3)_3$$

In addition, the finishing space 230 receiving the finishing portion 310 provided on the end of the drum 300 is provided between the peripheral portions 211 and 212 sewn with the adhesive-coated sewing thread 220 so as to tightly receive and protect the finishing portion 310 provided on the end of the drum 300, thereby obtaining sealing ability.

In addition, as illustrated in FIG. 6, the finishing portion 310 provided on the end of the drum 300 may be manufactured by bending a separate finishing material and disposing the bent finishing material on the end of the drum 300 or by bending the end of the drum 300.

The finishing portion 310 formed as described above may have a variety of shapes such as a circular ring, an arc-shaped ring, a T-shaped ring, a ring overlapped such that the end of the drum 300 is double-layered, and the like. The finishing space 230 is formed to tightly receive and protect the finishing portion 310 having a variety of shapes as described above.

The finishing space 230 may be formed in the central portion of the drum sealing gasket 200 of the present disclosure in the longitudinal direction to receive the finishing portion 310 formed by finishing the end of the drum 300.

A portion of one peripheral portion of the peripheral portions 211 and 212 folded over the length forms the extension 240 to cover a portion of the other peripheral portion of the peripheral portions 211 and 212. A flexible band 250 is added to the surface of the extension 240 and sewn with the adhesive-coated sewing thread 220, thereby being integrated with the extension 240.

The extension 240 is formed in order to provide a seal while surrounding an outer circumferential portion, i.e., a sealing portion, of the end of the drum 300, as illustrated in FIG. 6.

In addition, the flexible band 250 is provided on the surface of the extension 240 in order to provide the outer circumferential portion, i.e., the sealing portion, of the end of the drum 300 with durability when sealing the same and improve fluid tightness by increasing the sealing property of the flexible band 250.

The flexible band 250 is made of one selected from among elastic PVC, rubber, silicone, and soft synthetic resin, thereby providing the outer circumferential portion of the end of the drum 300 with further enhanced sealing property.

In addition, as illustrated in FIG. 3, a mesh-shaped flexible band protection member 260 is added and bonded to the rear surface of the flexible band 250 in order to enhance the strength of the flexible band 250, with the degree of elasticity of the flexible band protection member 260 being equivalent to that of the flexible band 250.

When the belt 210 is pulled and disposed on the end of the drum 300 in order to increase the sealing force of the outer circumferential portion, i.e., the sealing portion, of the drum 300, the flexible band 250 may be stretched and thus have cracks or be torn. Thus, in order to prevent this problem, the flexible band protection member 260 is bonded to the flexible band 250.

In addition, the flexible band 250 is added to the extension 240 and is sewn to the flexible band 250 with the adhesive-coated sewing thread 220 because, when the adhesive-coated sewing thread 220 is torn due to friction and heat caused by the rotation of the drum while the drum sealing gasket 200 according to the present disclosure disposed on the end of the drum 300 is being used, the dry coating adhesive may be molten by the heat to be sticky so that the binding force of the sewn portions may be continuously maintained instead of being broken.

In addition, one longitudinal end of the flexible band 250 is sewn to the longitudinal end of the extension 240 so as not to be exposed. When the gasket 200 is disposed on the drum 300, an adhesive is applied between the drum 300 and the gasket 200 so that the gasket 200 is firmly and reliably disposed on the drum 300. In this case, when the adhesive is in direct contact with the flexible band 250, the flexible band 250 may be dissolved or damaged. Thus, the longitudinal end of the flexible band 250 sewn to the longitudinal end of the extension 240 may prevent this problem.

In addition, the belt 210 from which the gasket 200 according to the present disclosure is manufactured is subjected to pressure heat treatment while being passed between hot rolls. Accordingly, the surface of the gasket according to the present disclosure may remain beautiful without lint thereon. At the same time, the binding force of the natural fiber and the synthetic fiber entangled with and bound to each other may be reliably maintained instead of being broken.

Figure 5:
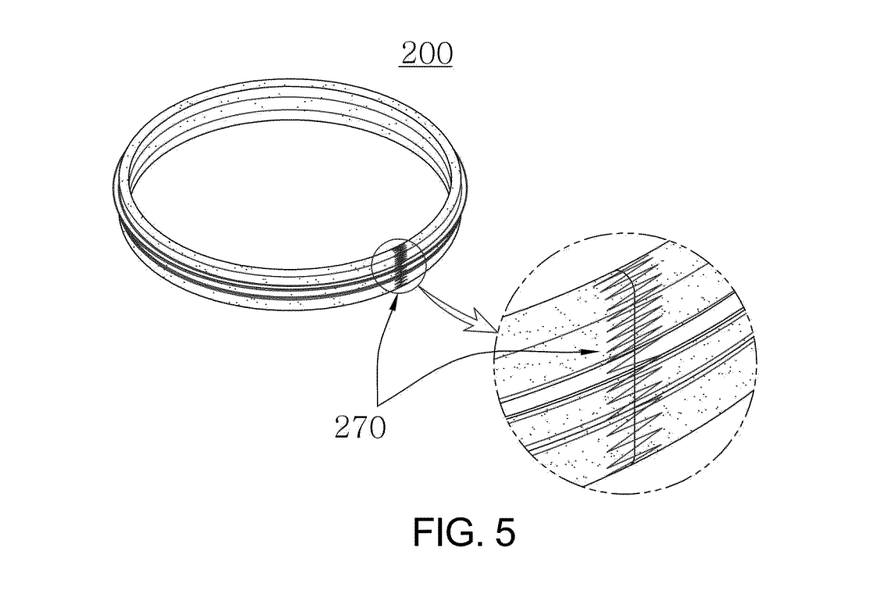
FIG. 5 is a perspective view illustrating the drum sealing gasket of a washing and drying machine according to the present disclosure, with both ends thereof being finished.

Both the ends of the belt, to which the flexible band 250 is sewn as described above, are brought into butt contact with each other without a height difference, and the contact portions are sewn with the adhesive-coated sewing thread 220, thereby forming a binding portion 270 as illustrated in FIG. 5. Accordingly, the drum sealing gasket 200 of a washing and drying machine may be firmly and reliably disposed and used depending on the shape of the outer circumferential shape of the end of the drum 300.

In addition, the adhesive-coated sewing thread 220 may also be used as a sewing thread for binding the binding portion 270.

The drum sealing gasket 200 of a washing and drying machine according to the present disclosure as described above has a predetermined degree of flexibility. When the drum sealing gasket 200 is pulled and then disposed on an end of the drum 300, the drum sealing gasket 200 is restored from the pulled position to be tightly fixed to the end of the drum 300, thereby maintaining fluid tightness.

As set forth above, the drum sealing gasket of a washing and drying machine according to the present disclosure may have improved sealing force and protect the end of the drum of a washing and drying machine. Even in the case in which a sewn line of the gasket is torn during use, the binding force of the components of the gasket may be firmly maintained instead of being broken, thereby increasing the longevity of the gasket.

Although the exemplary embodiments of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. A drum sealing gasket of a washing and drying machine, the drum sealing gasket comprising:
   a band-shaped belt of a cut felt manufactured by mixing natural fiber that is a mixture of one or more among wool fiber, cotton fiber, hemp fiber, and silk fiber and synthetic fiber that is a mixture of one or more among polyolefin, polyester, polyamide, polyacrylic, rayon, and nylon;
   wherein the belt includes a first peripheral edge and a second peripheral edge extending along a longitudinal direction of the belt, the first peripheral edge being folded inwardly to a first width that does not reach a central line extending in a widthwise direction of the belt, and the second peripheral edge being folded inwardly to a second width that exceeds a central widthwise line of the belt;

wherein the first and second peripheral edges are integrally sewn to the belt using a sewing thread coated with a polydimethylsiloxane adhesive, the sewing thread being manufactured by immersing a fiber thread in liquid polydimethylsiloxane to impregnate the fiber thread, withdrawing the impregnated fiber thread from the liquid polydimethylsiloxane, and subsequently drying the thread to form a dried polydimethylsiloxane adhesive coating thereon;

a finishing space provided in a transverse-direction central portion of the belt to extend in a longitudinal direction with a width of 2 mm to 15 mm such that a finishing portion provided on an end of a drum is tightly received therein;

an extension portion formed by the second peripheral edge extending over at least a portion of the first peripheral edge;

a flexible band attached to a surface of the extension portion such that a distal end of the extension portion remains partially exposed, the flexible band being sewn to the extension portion using the sewing thread coated with a polydimethylsiloxane; and a binding portion formed by abutting both longitudinal ends of the belt without a height difference and sewing the abutted ends together using the sewing thread coated with the polydimethylsiloxane adhesive.

2. The drum sealing gasket of claim 1, wherein the felt of the belt further comprises threads of natural or synthetic fiber mixed to the natural fiber and the synthetic fiber.

3. The drum sealing gasket of claim 2, wherein the threads are coated with an adhesive.

4. The drum sealing gasket of claim 1, wherein the natural fiber and the synthetic fiber are mixed such that a mixing ratio of the natural fiber is 30% to 70% by weight and a mixing ratio of the synthetic fiber is 30% to 70% by weight.

5. The drum sealing gasket of claim 1, wherein the flexible band comprises one selected from among elastic PVC, rubber, silicone, and soft synthetic resin.

6. The drum sealing gasket of claim 1, wherein a mesh-shaped flexible band protection member is added to a rear surface of the flexible band, with a degree of elasticity of the flexible band protection member being equivalent to that of the flexible band.

7. The drum sealing gasket of claim 1, wherein the belt is subjected to pressure heat treatment while being passed between hot rolls so that a state in which the natural fiber and the synthetic fiber are entangled with and bound to each other is stably maintained and a surface of the belt has no lint.

8. The drum sealing gasket of claim 1, wherein the finishing space has a width allowing the finishing portion provided on the end of the drum to be tightly received in the finishing space.

* * * * *